United States Patent
Hu et al.

(10) Patent No.: US 12,100,130 B2
(45) Date of Patent: Sep. 24, 2024

(54) APPARATUS AND METHOD FOR DETECTING TAB FOLDING, AND IMAGE ANALYZER

(71) Applicant: CONTEMPORARY AMPEREX TECHNOLOGY CO., LIMITED, Ningde (CN)

(72) Inventors: Liangjin Hu, Ningde (CN); Jinghua Huang, Ningde (CN); Kunming Zhang, Ningde (CN); Guannan Jiang, Ningde (CN); Lin Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 188 days.

(21) Appl. No.: 17/885,671

(22) Filed: Aug. 11, 2022

(65) Prior Publication Data
US 2023/0064943 A1 Mar. 2, 2023

Related U.S. Application Data

(63) Continuation of application No. PCT/CN2021/114622, filed on Aug. 26, 2021.

(51) Int. Cl.
*G06T 7/00* (2017.01)
*G06T 7/60* (2017.01)
(Continued)

(52) U.S. Cl.
CPC ............. *G06T 7/0004* (2013.01); *G06T 7/60* (2013.01); *H04N 23/56* (2023.01); *H04N 23/69* (2023.01);
(Continued)

(58) Field of Classification Search
CPC ............ G06T 7/0004; G06T 7/60; G06T 2207/20221; G06T 2207/30242;
(Continued)

(56) References Cited

U.S. PATENT DOCUMENTS

| | | |
|---|---|---|
| 9,941,506 B2 | 4/2018 | Hiroki et al. |
| 2015/0243962 A1 | 8/2015 | Hiroki et al. |

(Continued)

FOREIGN PATENT DOCUMENTS

| | | |
|---|---|---|
| CN | 103487440 B | 11/2015 |
| CN | 108375544 A | 8/2018 |

(Continued)

OTHER PUBLICATIONS

Machine translation for CN 113252698, IDS (Year: 2021).*
(Continued)

*Primary Examiner* — Qian Yang
(74) *Attorney, Agent, or Firm* — Ladas & Parry LLP

(57) ABSTRACT

This application provides an apparatus and method for detecting tab folds, and an image analyzer. The apparatus for detecting tab folds includes: a first image obtaining module, configured to obtain a first image of a first lateral face of tabs of a battery cell; a second image obtaining module, configured to obtain a second image of a second lateral face of the tabs, where the second lateral face is different from the first lateral face; and an image analyzer, configured to obtain, based on the first image, a first number of layers of the tabs corresponding to the first lateral face, and obtain, based on the second image, a second number of layers of the tabs corresponding to the second lateral face, and determine, based on at least one of the first number of layers or the second number of layers, whether the tabs are in a folded state.

15 Claims, 11 Drawing Sheets

(51) Int. Cl.
*H04N 23/56* (2023.01)
*H04N 23/69* (2023.01)

(52) U.S. Cl.
CPC ............... *G06T 2207/20221* (2013.01); *G06T 2207/30242* (2013.01)

(58) Field of Classification Search
CPC . G06T 2207/10148; G06T 5/50; H04N 23/56; H04N 23/69; G01N 21/86; G01N 2021/8438; G01N 21/95; G01N 21/8851; Y02E 60/10; H01M 10/4285; Y02P 70/50
See application file for complete search history.

(56) References Cited

U.S. PATENT DOCUMENTS

| | | |
|---|---|---|
| 2018/0226629 A1 | 8/2018 | Hiroki et al. |
| 2020/0220150 A1 | 7/2020 | Hiroki et al. |
| 2021/0112201 A1* | 4/2021 | Cho .................. H01L 27/14627 |
| 2023/0270414 A1* | 8/2023 | Friebe .................. G06V 10/761 600/437 |

FOREIGN PATENT DOCUMENTS

| | | |
|---|---|---|
| CN | 207992073 U | 10/2018 |
| CN | 209231238 U | 8/2019 |
| CN | 110779446 A | 2/2020 |
| CN | 112525912 A | 3/2021 |
| CN | 112525917 A | 3/2021 |
| CN | 113252698 A | 8/2021 |
| KR | 102236815 B1 | 4/2021 |

OTHER PUBLICATIONS

Communication from EPO based on copending EP application 21 912 323.9 dated Sep. 8, 2023.
Communication under from EPO Intention to Grant for copending EP application 21 912 323.9 dated Sep. 8, 2023.
Extended European Search Report dated Feb. 8, 2023 for Application No. EP 21912323.

* cited by examiner

APPARATUS AND METHOD FOR DETECTING TAB FOLDING, AND IMAGE ANALYZER

CROSS-REFERENCE TO RELATED APPLICATIONS

This application is a continuation of PCT/CN2021/114622 filed on Aug. 26, 2021, which is incorporated herein by reference in its entirety.

TECHNICAL FIELD

This application relates to the technical field of batteries, and in particular, to an apparatus and method for detecting tab folding, and an image analyzer.

BACKGROUND

Currently, in an assembling stage of a lithium battery, a battery cell is typically manufactured by two processes: winding and stacking. In both the winding process and the stacking process, a positive tab and a negative tab of a battery cell (for example, the tabs are made of an aluminum foil or a copper foil) are just a few microns in thickness, and therefore, are of relatively low strength. The positive tab and the negative tab are prone to fold during manufacturing of the battery cell. The tabs are folded in two ways. One is to fold the tabs in a tab region, and the other is to fold the tabs into a coating region of the battery cell.

To detect the folded battery cells, three solutions are available in the prior art to detecting tab folding of a battery cell during manufacturing: 1) detecting the tab folding by using a sensor such as a charge-coupled device (CCD) on a winding machine or a stacking machine; 2) detecting the tab folding manually through visual inspection; and 3) detecting the tab folding through a high potential (hi-pot) test.

SUMMARY

The applicant of this application finds that the solution to detecting tab folding in the prior art is not accurate enough.

In view of this, an embodiment of this application provides an apparatus or method for detecting tab folding, so as to improve accuracy of detecting tab folding.

According to a first aspect, this application provides an apparatus for detecting tab folding, including: a first image obtaining module, configured to obtain a first image of a first lateral face of tabs of a battery cell; a second image obtaining module, configured to obtain a second image of a second lateral face of the tabs, where the second lateral face is different from the first lateral face; and an image analyzer, configured to obtain, based on the first image, a first number of layers of the tabs corresponding to the first lateral face, and obtain, based on the second image, a second number of layers of the tabs corresponding to the second lateral face, and determine, based on at least one of the first number of layers or the second number of layers, whether the tabs are in a folded state.

In the technical solution of this embodiment of this application, the first image of the first lateral face and the second image of the second lateral face of the tabs of the battery cell are obtained, and then the corresponding first number of layers and second number of layers of the tabs are obtained by analyzing the first image and the second image respectively. Based on at least one of the first number of layers or the second number of layers, it is determined whether the tabs are in a folded state. In this way, the number of layers on the two lateral faces of the tabs can be accurately obtained by obtaining the images of the two lateral faces of the tabs. Based on at least one of the two numbers of layers, it is more accurately determined whether the tabs are in a folded state. Therefore, the foregoing embodiment can improve the accuracy of detecting tab folding.

In some embodiments, the first image obtaining module includes a first photographing device and a first zoom lens adjacent to the first photographing device. The first photographing device is configured to shoot a plurality of first initial images of the first lateral face at different focal lengths in a case that the first zoom lens is zoomed for a plurality of times, and send the plurality of first initial images to the image analyzer. The second image obtaining module includes a second photographing device and a second zoom lens adjacent to the second photographing device. The second photographing device is configured to shoot a plurality of second initial images of the second lateral face at different focal lengths in a case that the second zoom lens is zoomed for a plurality of times, and send the plurality of second initial images to the image analyzer. The image analyzer is configured to synthesize the plurality of first initial images into one first image and synthesize the plurality of second initial images into one second image by using a multi-frame image synthesis algorithm. In this embodiment, a plurality of first initial images of the first lateral face and a plurality of second initial images of the second lateral face at different focal lengths can be obtained. In this way, it is convenient to synthesize a plurality of first initial images at different focal lengths into one first image and synthesize a plurality of second initial images at different focal lengths into one second image, thereby improving definition of the first image and the second image, obtaining the first number of layers and the second number of layers that are more accurate, and in turn, improving the accuracy of detecting tab folding.

In some embodiments, zoom ranges of the first zoom lens and the second zoom lens allow a tolerance of offset between tabs. In this way, in a case that one tab is offset from another, the offset between the tabs can be identified, thereby making it convenient to obtain clear images at different focal lengths, and improving the accuracy of detecting tab folding subsequently.

In some embodiments, the image analyzer is configured to analyze the first image to obtain characteristic parameters of a plurality of lines in the first image, obtain the first number of layers of the tabs based on the characteristic parameters of the plurality of lines in the first image, analyze the second image to obtain characteristic parameters of a plurality of lines in the second image, and obtain the second number of layers of the tabs based on the characteristic parameters of the plurality of lines in the second image. In this embodiment, a plurality of lines in the image can be obtained based on the image of the lateral face of the tabs. The number of layers of the tabs can be obtained based on the characteristic parameters of the plurality of lines. The obtaining the number of layers of the tabs by using the characteristic parameters of the lines in the image can improve the accuracy of the number of layers of the tabs, and in turn, improve the accuracy of detecting tab folding.

In some embodiments, the characteristic parameters include at least one of curvature, thickness, direction change trend, or length of the lines. Such parameters reflect the number of layers and appearance of the tabs, and make it convenient to detect the folded state of the tabs.

In some embodiments, the image analyzer is further configured to determine, based on the length of the lines, whether the tabs are folded over to a coating region. This tells whether there is a risk of folding the tabs over to the coating region, thereby reducing safety hazards of the battery cell.

In some embodiments, the image analyzer is configured to determine, in a case of at least one of inequality between the first number of layers and a preset value or inequality between the second number of layers and a preset value, that the tabs are in the folded state. In this way, it can be more accurately detected whether the tabs are folded.

In some embodiments, the image analyzer is configured to compare the first number of layers in a first tab root region in the first image with the preset value, and/or compare the second number of layers in a second tab root region in the second image with the preset value. The first tab root region is a region adjacent to a coating region of the battery cell on the first lateral face of the tabs, and the second tab root region is a region adjacent to the coating region on the second lateral face of the tabs. In this embodiment, by comparing the number of layers of the tabs in the root region of the tabs with a preset value, it is determined whether the tabs are in a folded state, thereby significantly improving the accuracy of detecting tab folding.

In some embodiments, the image analyzer is configured to determine, based on an appearance and a number of lines in a first tab top region in the first image, whether the tabs are in the folded state; and/or determine, based on an appearance and a number of lines in a second tab top region in the second image, whether the tabs are in the folded state. The first tab top region is a region farther from the coating region than the first tab root region on the first lateral face of the tabs, and the second tab top region is a region farther from the coating region than the second tab root region on the second lateral face of the tabs. In this embodiment, whether the tabs are in a folded state is further determined based on the appearance and the number of lines in the tab top region, so that the folded state of the tabs is determined supplementally.

In some embodiments, the first image obtaining module further includes a first light source, where the first light source is located between the first zoom lens and the first lateral face of the tabs. The second image obtaining module further includes: a prism, disposed on the side of the second lateral face of the tabs, where a first mirror face of the prism is oriented toward the second lateral face of the tabs, and a second mirror face of the prism is oriented toward the second zoom lens; and a second light source, disposed between the second zoom lens and the second mirror face of the prism, where light emitted by the second light source enters the prism through the second mirror face, exits from the first mirror face, and strikes the second lateral face of the tabs. In this embodiment, by disposing the first light source and the second light source, the photographing device can obtain a clearer and brighter image, thereby improving the accuracy of detecting tab folding. By disposing the prism, an optical path can be changed, and the optical path is bent to facilitate the detection of the tabs.

According to a second aspect, this application provides a method for detecting tab folding, including: receiving a first image of a first lateral face of tabs of a battery cell and a second image of a second lateral face of the tabs, where the second lateral face is different from the first lateral face; obtaining, based on the first image, a first number of layers of the tabs corresponding to the first lateral face, and obtaining, based on the second image, a second number of layers of the tabs corresponding to the second lateral face; and determining, based on at least one of the first number of layers or the second number of layers, whether the tabs are in a folded state.

In the foregoing technical solution of this application, the number of layers on the two lateral faces of the tabs can be accurately obtained by obtaining the images of the two lateral faces of the tabs. Based on at least one of the two numbers of layers, it is more accurately determined whether the tabs are in a folded state. Therefore, the foregoing embodiment can improve the accuracy of detecting tab folding.

In some embodiments, the step of receiving the first image and the second image includes: receiving a plurality of first initial images of the first lateral face at different focal lengths and a plurality of second initial images of the second lateral face at different focal lengths. The method further includes: synthesizing, before obtaining the first number of layers based on the first image and obtaining the second number of layers based on the second image, the plurality of first initial images into one first image and synthesizing the plurality of second initial images into one second image by using a multi-frame image synthesis algorithm. In this embodiment, a plurality of first initial images of the first lateral face and a plurality of second initial images of the second lateral face at different focal lengths can be obtained. In this way, it is convenient to synthesize a plurality of first initial images at different focal lengths into one first image and synthesize a plurality of second initial images at different focal lengths into one second image, thereby improving definition of the first image and the second image, obtaining the first number of layers and the second number of layers that are more accurate, and in turn, improving the accuracy of detecting tab folding.

In some embodiments, the step of obtaining the first number of layers based on the first image and obtaining the second number of layers based on the second image includes: analyzing the first image to obtain characteristic parameters of a plurality of lines in the first image, obtaining the first number of layers of the tabs based on the characteristic parameters of the plurality of lines in the first image, analyzing the second image to obtain characteristic parameters of a plurality of lines in the second image, and obtaining the second number of layers of the tabs based on the characteristic parameters of the plurality of lines in the second image. In this embodiment, the characteristic parameters of lines in the image are obtained based on the image. The number of layers of the tabs is obtained by using the characteristic parameters of the lines in the image, thereby improving the accuracy of the number of layers of the tabs, and in turn, improving the accuracy of detecting tab folding.

In some embodiments, the characteristic parameters include at least one of curvature, thickness, direction change trend, or length of the lines.

In some embodiments, the method further includes: determining, based on the length of the lines, whether the tabs are folded over to a coating region. This tells whether there is a risk of folding the tabs over to the coating region, thereby reducing safety hazards of the battery cell.

In some embodiments, the step of determining, based on at least one of the first number of layers or the second number of layers, whether the tabs are in a folded state, includes: determining, in a case of at least one of inequality between the first number of layers and a preset value or inequality between the second number of layers and a preset value, that the tabs are in the folded state. In this embodiment, by comparing the first number of layers with the preset value and/or comparing the second number of layers with the preset value, based on a comparison result, it is determined whether the tabs are in a folded state, thereby more accurately detecting whether the tabs are folded.

In some embodiments, the step of comparing the first number of layers with the preset value and/or comparing the second number of layers with the preset value includes: comparing the first number of layers in a first tab root region in the first image with the preset value, and/or comparing the second number of layers in a second tab root region in the second image with the preset value. The first tab root region is a region adjacent to a coating region of the battery cell on the first lateral face of the tabs, and the second tab root region is a region adjacent to the coating region on the second lateral face of the tabs. In this embodiment, based on the number of layers of the tabs in the root region of the tabs, it is determined whether the tabs are in a folded state, thereby significantly improving the accuracy of detecting tab folding.

In some embodiments, the method further includes: determining, based on an appearance and a number of lines in a first tab top region in the first image, whether the tabs are in the folded state; and/or determining, based on an appearance and a number of lines in a second tab top region in the second image, whether the tabs are in the folded state. The first tab top region is a region farther from the coating region than the first tab root region on the first lateral face of the tabs, and the second tab top region is a region farther from the coating region than the second tab root region on the second lateral face of the tabs. In this embodiment, whether the tabs are in a folded state may be further determined based on the appearance and the number of lines in the tab top region, so that the folded state of the tabs is determined supplementally.

According to a third aspect, this application provides an image analyzer, including: a receiving unit, configured to receive a first image of a first lateral face of tabs of a battery cell and a second image of a second lateral face of the tabs, where the second lateral face is different from the first lateral face; an analysis unit, configured to obtain, based on the first image, a first number of layers of the tabs corresponding to the first lateral face, and obtain, based on the second image, a second number of layers of the tabs corresponding to the second lateral face; and a determining unit, configured to determine, based on at least one of the first number of layers or the second number of layers, whether the tabs are in a folded state. This can improve the accuracy of detecting tab folding.

According to a fourth aspect, this application provides an image analyzer, including: a memory; and a processor coupled to the memory. The processor is configured to perform the foregoing method based on an instruction stored in the memory.

According to a fifth aspect, this application provides a computer-readable storage medium, on which a computer program instruction is stored. When executed by a processor, the computer program instruction implements the method described above.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1A:
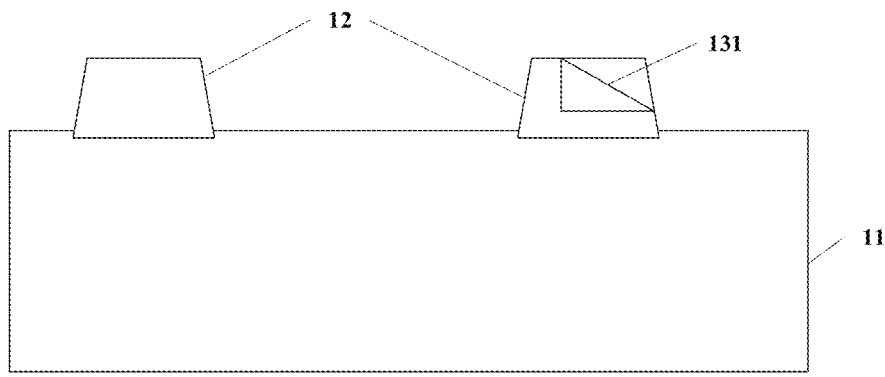
FIG. 1A to FIG. 1H are schematic diagrams of tabs in a folded state according to some embodiments of this application.

The drawings are not drawn to scale.

Reference numerals: cell 1, coating region 11, tab 12, tabs in different folded states 131-138, first lateral face 121, second lateral face 122, first image obtaining module 21, second image obtaining module 22, image analyzer 23, first photographing device 211, first zoom lens 212, first light source 213, second photographing device 221, second zoom lens 222, second light source 223, prism 224, tab root region 51, and tab top region 52.

DETAILED DESCRIPTION OF EMBODIMENTS

The following gives a more detailed description of implementations of this application with reference to drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", and "third" are merely intended for descriptive purposes, but are not intended to indicate or imply order of precedence. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

FIG. 1A to FIG. 1H are schematic diagrams of tabs in a folded state according to some embodiments of this application. FIG. 1A to FIG. 1H show 8 folded states of tabs 12. The 8 folded states are merely exemplary rather than exhaustive.

Figure 1B:
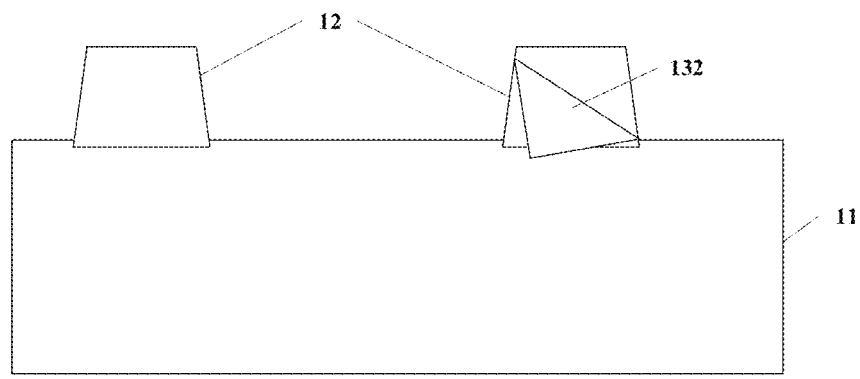
Figure 1C:
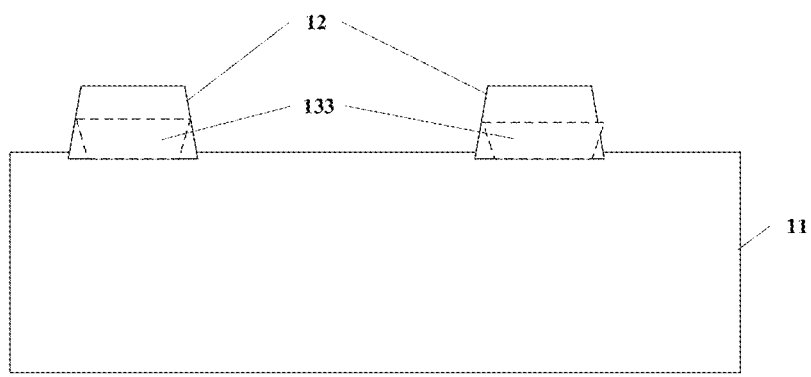
Figure 1D:
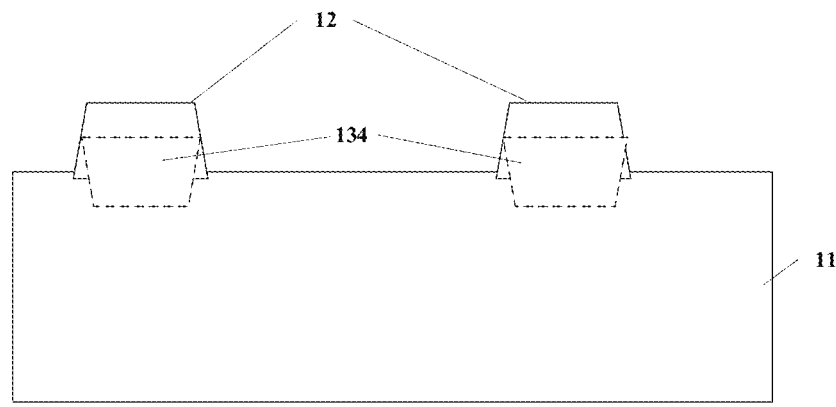
Figure 1E:
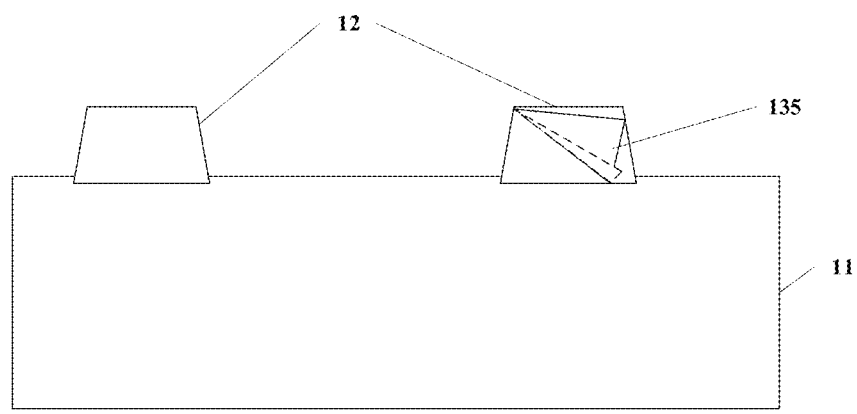
Figure 1F:
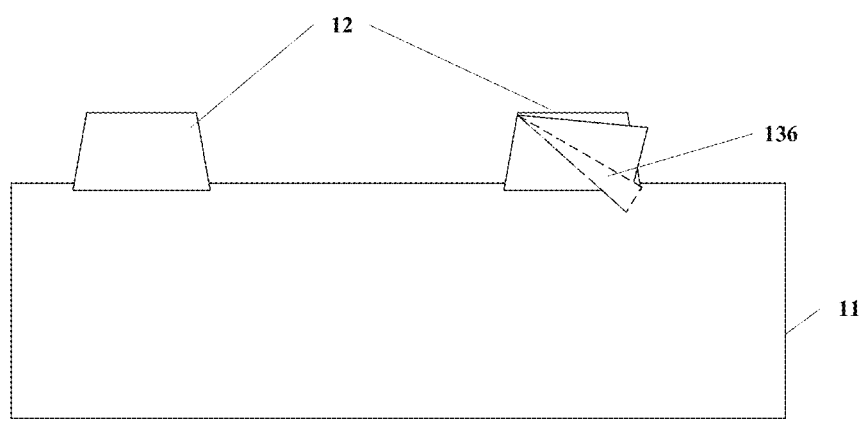
Figure 1G:
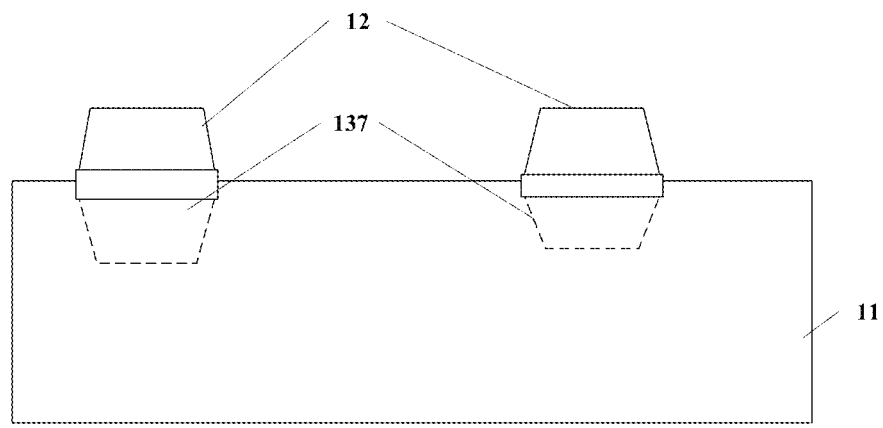
Figure 1H:
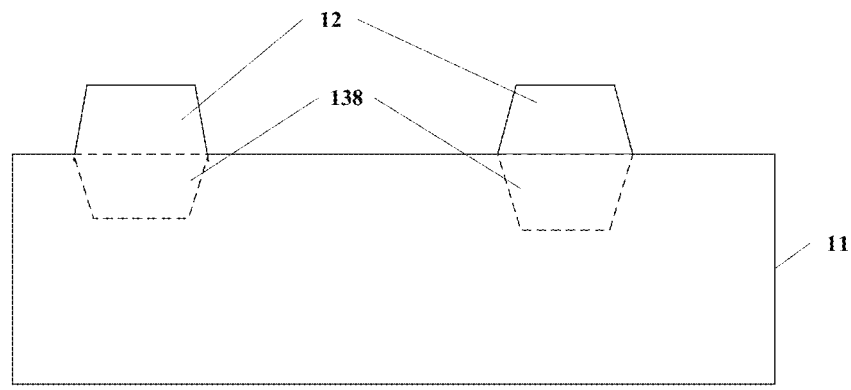

As shown in FIG. 1A, in a first folded state 131 of the tabs 12, the tabs 12 are folded by folding a corner, but not folded over to a coating region 11. As shown in FIG. 1B, in a second folded state 132 of the tabs 12, the tabs 12 are folded by folding a corner, and folded over to the coating region 11. As shown in FIG. 1C, in a third folded state 133 of the tabs 12, the tabs 12 are folded along a line parallel to a boundary between the tabs and the coating region, but not folded over to the coating region 11. As shown in FIG. 1D, the tabs 12 are folded along a line parallel to a boundary between the tabs and the coating region, and are folded over to the coating region 11. As shown in FIG. 1E, the tabs 12 are folded in a stacked way, but not folded over to the coating region 11. As shown in FIG. 1E, the tabs 12 are folded in a stacked way, and are folded over to the coating region 11. As shown in FIG. 1G, a part of a tab 12 is folded over to the coating region 11. As shown in FIG. 1H, the tab 12 is fully folded over to the coating region 11.

For the folded states of the tabs shown in FIG. 1B, FIG. 1D, FIG. 1F, FIG. 1G, and FIG. 1H, with the tabs already folded over to the coating region, a battery cell formed by using such tabs will incur low capacitance, short circuit, thermal runaway, and other problems after being made into a battery, thereby affecting battery safety. In the folded states of the tabs shown in FIG. 1A, FIG. 1C, and FIG. 1E, although the tabs are not folded over to the coating region, a subsequent processing process is still at risk of folding the tabs over to the coating region or at risk of poor soldering of the tabs.

To detect a battery cell with a folded tab, three solutions are available in the related art to detecting tab folding of a battery cell during manufacturing: 1) detecting the tab folding by using a sensor such as a CCD on a winding machine or a stacking machine; 2) detecting the tab folding manually through visual inspection; and 3) detecting the tab folding through a hi-pot test. Limited by the CCD photographing method, space, and other factors, the CCD and sensor on the winding machine or stacking machine are unable to accurately detect defects of the tabs that are in various folded states. The manual visual inspection is inefficient, is very prone to omission of detection caused by fatigue. By using the hi-pot testing method, only a part of battery cells with tabs folded over to the coating region can be detected. Definitely, in the related art, other methods are still available for detecting tab folding. However, the applicant of this application finds that the solutions to detecting tab folding in the related art are not accurate enough.

In view of this, an embodiment of this application provides an apparatus or method for detecting tab folding, so as to improve accuracy of detecting tab folding.

Figure 2:
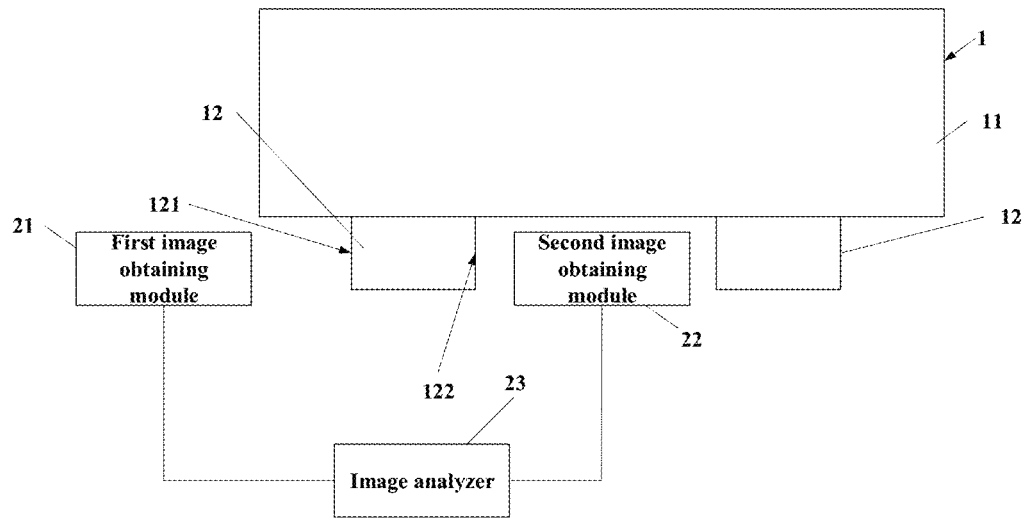
FIG. 2 is a schematic structural diagram of an apparatus for detecting tab folding according to an embodiment of this application.

FIG. 2 is a schematic structural diagram of an apparatus for detecting tab folding according to an embodiment of this application.

As shown in FIG. 2, the apparatus includes a first image obtaining module 21, a second image obtaining module 22, and an image analyzer 23. The first image obtaining module 21 and the second image obtaining module 22 are electrically connected to the image analyzer 23 separately.

The first image obtaining module 21 is configured to obtain a first image of a first lateral face 121 of tabs 12 of a battery cell 1.

The second image obtaining module 22 is configured to obtain a second image of a second lateral face 122 of the tabs 12.

Here, the second lateral face 122 is different from the first lateral face 121. For example, as shown in FIG. 2, the second lateral face 122 is opposite to the first lateral face 121. The first lateral face 121 and the second lateral face 122 mean lateral faces adjacent to the coating region 11. For example, the first lateral face and the second lateral face may be perpendicular to a boundary between the tab 12 and the coating region 11.

The image analyzer 23 is configured to obtain, based on the first image, a first number of layers of the tabs corresponding to the first lateral face 121, and obtain, based on the second image, a second number of layers of the tabs corresponding to the second lateral face 122; and, determine, based on at least one of the first number of layers or the second number of layers, whether the tabs are in a folded state.

Generally, a plurality of layers of tabs exist in a battery cell. The tabs are stacked together. In the foregoing embodiment, the first image of the first lateral face and the second image of the second lateral face of the tabs of the battery cell are obtained, and then the corresponding first number of layers and second number of layers of the tabs are obtained by analyzing the first image and the second image respectively. Based on at least one of the first number of layers or the second number of layers, it is determined whether the tabs are in a folded state. In this way, the number of layers on the two lateral faces of the tabs can be accurately obtained by obtaining the images of the two lateral faces of the tabs. Based on at least one of the two numbers of layers, it is more accurately determined whether the tabs are in a folded state. Therefore, the foregoing embodiment can improve the accuracy of detecting tab folding.

In some embodiments, the image analyzer 23 is configured to determine, based on the first number of layers and the second number of layers, whether the tabs are in a folded state. In this embodiment, based on the two numbers of layers of the tabs, it is determined whether the tabs are in a folded state, thereby further improving the accuracy of detecting tab folding.

In some embodiments, the image analyzer 23 is configured to determine, in a case of at least one of inequality between the first number of layers and a preset value or inequality between the second number of layers and a preset value, that the tabs are in the folded state. Here, the preset value is a predetermined accurate value of the number of layers of the tabs. The preset value may be set according to actual conditions.

In the foregoing embodiment, by comparing the first number of layers with the preset value and/or comparing the second number of layers with the preset value, based on a comparison result, it is determined whether the tabs are in a folded state. For example, in a case that the first number of layers is not equal to the preset value, it is determined that the tabs are in a folded state, thereby more accurately detecting whether the tabs are folded.

Figure 3:
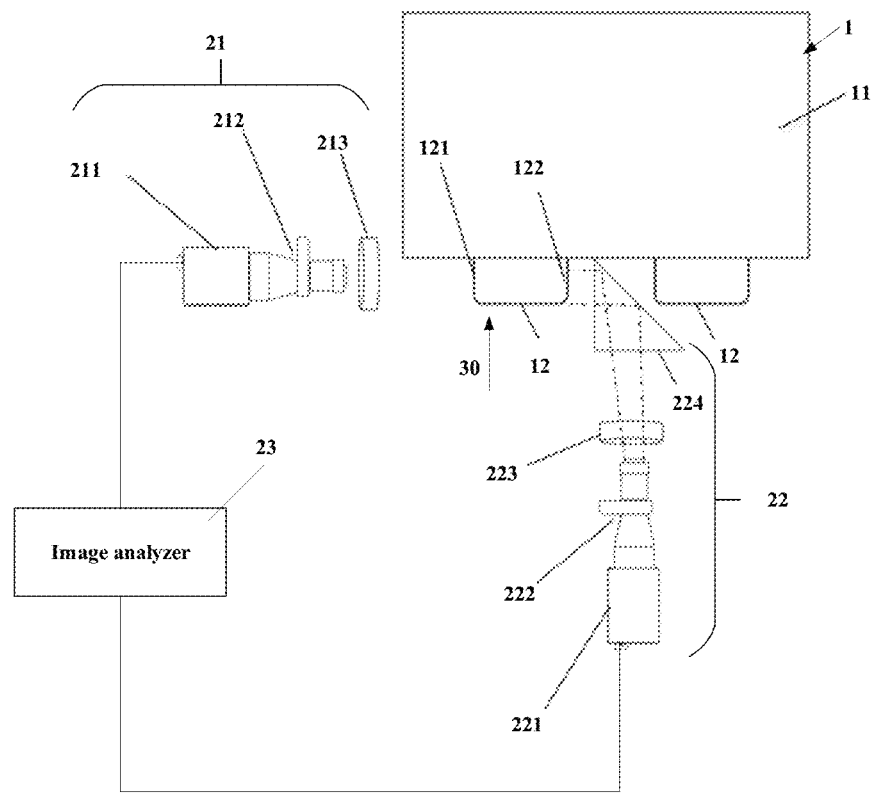
FIG. 3 is a schematic structural diagram of an apparatus for detecting tab folding according to another embodiment of this application.

FIG. 3 is a schematic structural diagram of an apparatus for detecting tab folding according to another embodiment of this application. As shown in FIG. 3, the apparatus includes a first image obtaining module 21, a second image obtaining module 22, and an image analyzer 23.

In some embodiments, the first image obtaining module 21 includes a first photographing device 211 and a first zoom lens 212 adjacent to the first photographing device 211. The first photographing device 211 is configured to shoot a plurality of first initial images of the first lateral face 121 at different focal lengths in a case that the first zoom lens 212 is zoomed for a plurality of times, and send the plurality of first initial images to the image analyzer 23. In this embodiment, a plurality of first initial images of the first lateral face at different focal lengths can be obtained, thereby making it convenient to synthesize the plurality of first initial images into a clearer first image subsequently.

In some embodiments, the second image obtaining module 22 includes a second photographing device 221 and a second zoom lens 222 adjacent to the second photographing device 221. The second photographing device 221 is configured to shoot a plurality of second initial images of the second lateral face 122 at different focal lengths in a case that the second zoom lens 222 is zoomed for a plurality of times, and send the plurality of second initial images to the image analyzer 23. In this embodiment, a plurality of second initial images of the second lateral face at different focal lengths can be obtained, thereby making it convenient to synthesize the plurality of second initial images into a clearer second image subsequently.

It needs to be noted that the first photographing device and second photographing device mean photographing elements that remain after the lens is removed, for example, an imaging medium.

The image analyzer 23 is configured to synthesize the plurality of first initial images into one first image and synthesize the plurality of second initial images into one second image by using a multi-frame image synthesis algorithm. By synthesizing a plurality of first initial images at different focal lengths into one first image and synthesizing a plurality of second initial images at different focal lengths into one second image, this embodiment improves definition of the first image and the second image, obtains the first number of layers and the second number of layers that are more accurate, and in turn, improves the accuracy of detecting tab folding.

Figure 11:
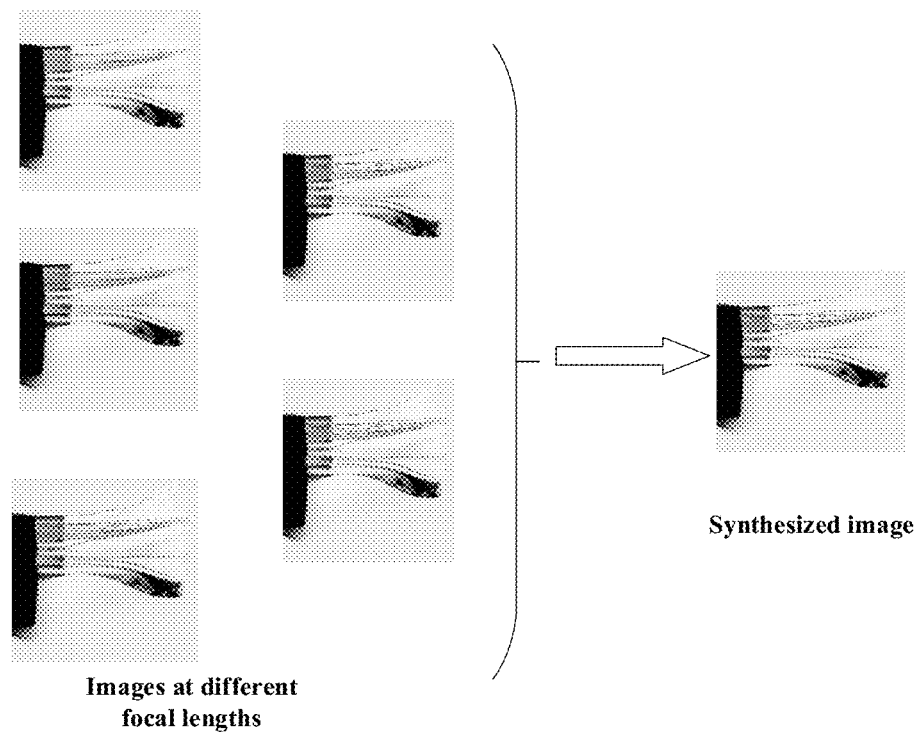
FIG. 11 is a schematic diagram of synthesizing a plurality of images of a lateral face of tabs into one image according to some embodiments of this application.

FIG. 11 is a schematic diagram of synthesizing a plurality of images of a lateral face of tabs into one image according to some embodiments of this application.

As shown in FIG. 11, the 5 images taken at different focal lengths may include different clear and unclear parts separately. By using the multi-frame image synthesis algorithm, the clear parts of the 5 images are synthesized to obtain a clear image. The multi-frame image synthesis algorithm is an algorithm known to a person skilled in the art, and is not described in detail here.

In some embodiments, by using the multi-frame image synthesis algorithm, the images of the first lateral face and the second lateral face of the tabs are obtained, and the appearance and dimension measurement data of the tabs in the images are analyzed and processed. For example, for images of tabs taken at different focal lengths, a plurality of images are synthesized into a high-definition 2.5D cross-sectional image of the tabs. An edge of the cross section of the tabs is extracted, and is partitioned into several line images. The appearance and dimension measurement data of the tabs on the first lateral face and the second lateral face in the images are analyzed and processed. The tabs are in a suspended free state, a plurality of layers of tabs may interfere with each other, for example, bond together, block each other, or reflect light to each other, and problems such as offset and deviation may occur during the winding or stacking of the tabs. Therefore, a cross-sectional line image of the first lateral face and the second lateral face of the tabs may be extracted by using a high-definition imaging device with a large depth of field and a high magnification. This improves a detectable rate of substandard tabs, and in turn, improves quality of the battery cell.

In some embodiments, the first photographing device 211 and second photographing device 221 are photographing devices such as a camera with a precision that is enough to identify a single tab (or referred to as a single layer of tab) with a thickness of less than or equal to 4 microns. By using such a camera as a photographing device, a clearer image can be obtained, thereby improving the accuracy of detecting tab folding subsequently. For example, the camera may be a 25-megapixel high-definition global exposure camera.

In some embodiments, the zoom ranges of the first zoom lens 212 and the second zoom lens 222 allow a tolerance of offset between the tabs. For example, the zoom lens described above tolerates a ±50 millimeter (mm) offset between the tabs. In other words, the zoom lens according to this embodiment of this application allows a tolerance of offset of −50 mm to +50 mm. In this way, in a case that one tab is offset from another, clear images of the tabs that are offset by different amounts can be obtained by using different focal lengths of the zoom lens, thereby improving the accuracy of detecting tab folding subsequently.

For example, the tolerance of offset between tabs is ±8 mm. The tolerance goes beyond the zoom range of a common camera lens, so that the image of the tabs is blurred and the detection effect of the tabs is affected. The foregoing embodiment of this application can photograph the offset tabs at a fixed focal length from different heights by using a zoom lens (such as a liquid zoom lens), and then synthesize a plurality of frames taken at a fixed focal length from different heights into one image, thereby making the image clearer. The zoom lens according to this embodiment of this application tolerates an offset of −50 mm to +50 mm, and therefore, tolerates an offset of ±8 mm of the tabs, thereby achieving clear images.

Different offset states of the tabs are described in detail below with reference to FIG. 4A to FIG. 4I. It needs to be noted that FIG. 4A to FIG. 4I are schematic sectional views seen from a viewing angle 30 shown in FIG. 3.

Figure 4A:
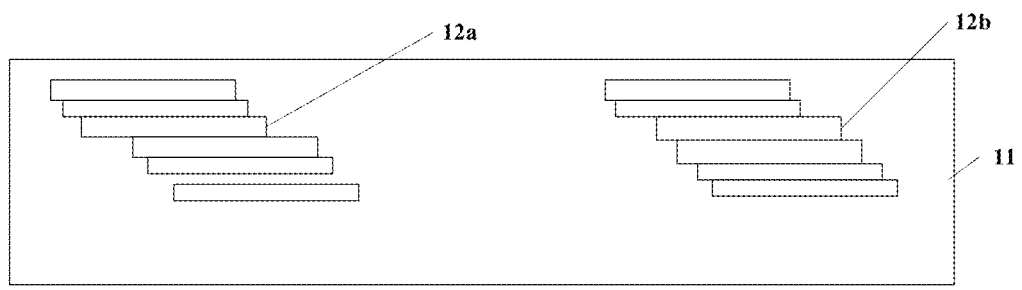
FIG. 4A to FIG. 4I are schematic diagrams of tabs in an offset state according to some embodiments of this application.

As shown in FIG. 4A, in each of two groups of tabs 12a and 12b, adjacent tabs are offset from each other by approximately equal amounts. That is, the amount by which one tab is offset from another is approximately equal between every two adjacent tabs. An offsetting direction of one of the two groups of tabs 12a and 12b is identical to an offsetting direction of the other group. For example, the tabs in each group are offset rightward gradually from the uppermost layer to the lowermost layer.

Figure 4B:
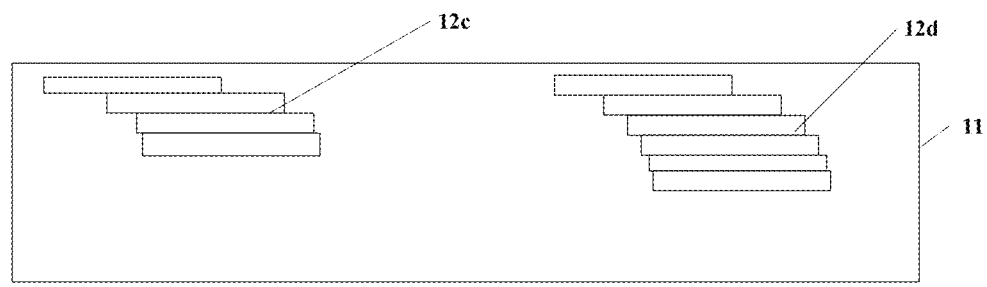

As shown in FIG. 4B, in each of the two groups of tabs 12c and 12d, adjacent tabs are offset from each other by progressive amounts. That is, the amount by which one tab is offset from another increases or decreases progressively between every two adjacent tabs. An offsetting direction of one of the two groups of tabs 12c and 12d is identical to an offsetting direction of the other group. For example, the tabs in each group are offset rightward gradually from the uppermost layer to the lowermost layer.

Figure 4C:
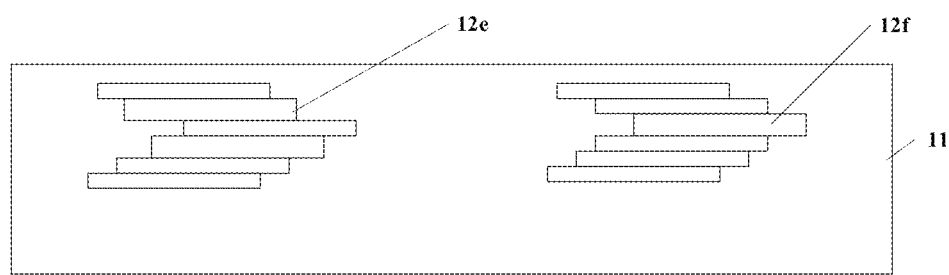

As shown in FIG. 4C, each of the two groups of tabs 12e and 12f is offset in a U-shape. An offsetting direction of one of the two groups of tabs 12e and 12f is identical to an offsetting direction of the other group. For example, the tabs in each group are offset rightward first and then leftward from the uppermost layer to the lowermost layer.

Figure 4D:
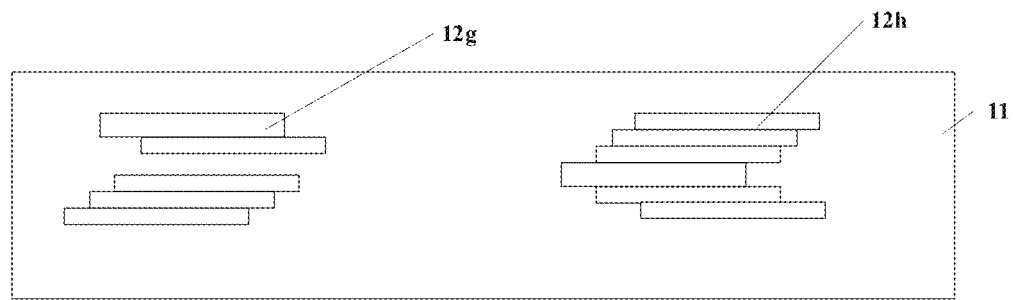

As shown in FIG. 4D, each of the two groups of tabs 12g and 12h is offset in a U-shape. An offsetting direction of one of the two groups of tabs 12g and 12h is opposite to an offsetting direction of the other group. For example, the tabs 12g in one group are offset rightward first and then leftward from the uppermost layer to the lowermost layer, and the tabs 12h in the other group are offset leftward first and then rightward from the uppermost layer to the lowermost layer.

Figure 4E:
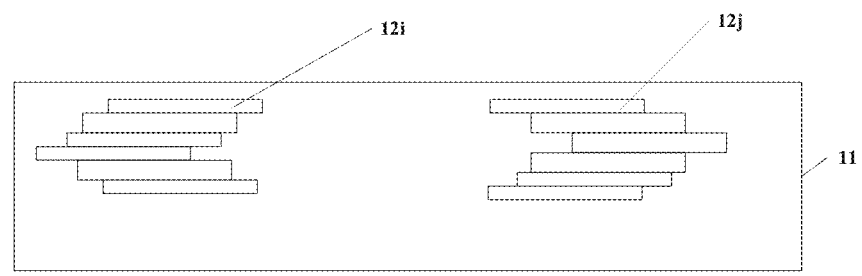

As shown in FIG. 4E, each of the two groups of tabs 12i and 12j is offset in a U-shape. An offsetting direction of one of the two groups of tabs 12i and 12j is opposite to an offsetting direction of the other group. For example, the tabs 12i in one group are offset leftward first and then rightward from the uppermost layer to the lowermost layer, and the tabs 12j in the other group are offset rightward first and then leftward from the uppermost layer to the lowermost layer.

Figure 4F:
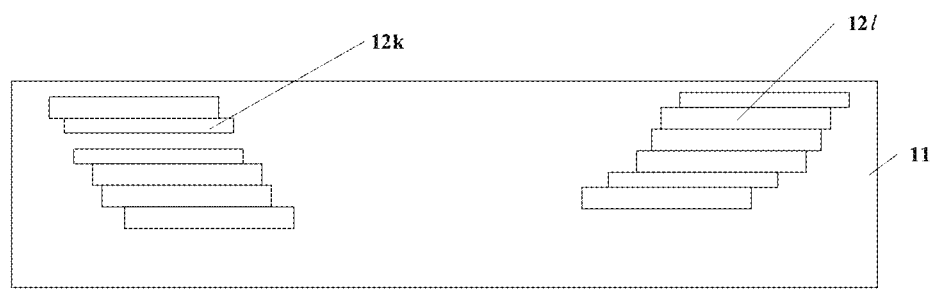

As shown in FIG. 4F, both groups of tabs 12k and 12l are offset (for example, by equal amounts). An offsetting direction of one of the two groups of tabs 12k and 12l is opposite to an offsetting direction of the other group. For example, the tabs 12k in one group are offset rightward in sequence from the uppermost layer to the lowermost layer, and the tabs 12l in the other group are offset leftward in sequence from the uppermost layer to the lowermost layer.

Figure 4G:
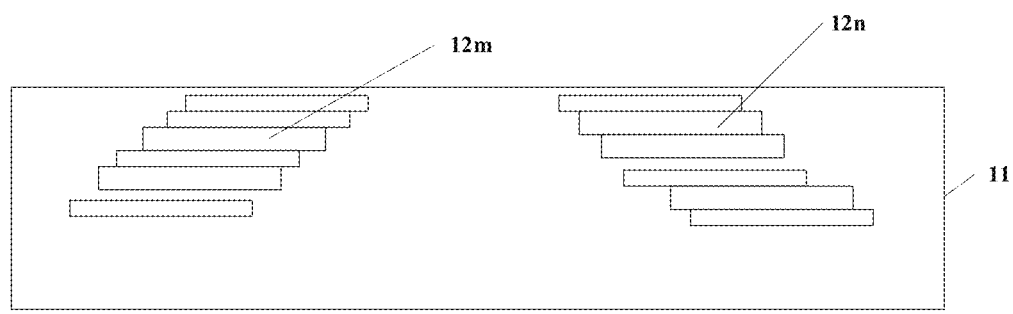

As shown in FIG. 4G, both groups of tabs 12m and 12n are offset (for example, by equal amounts). An offsetting direction of one of the two groups of tabs 12m and 12n is opposite to an offsetting direction of the other group. For example, the tabs 12m in one group are offset leftward in sequence from the uppermost layer to the lowermost layer, and the tabs 12n in the other group are offset rightward in sequence from the uppermost layer to the lowermost layer.

Figure 4H:
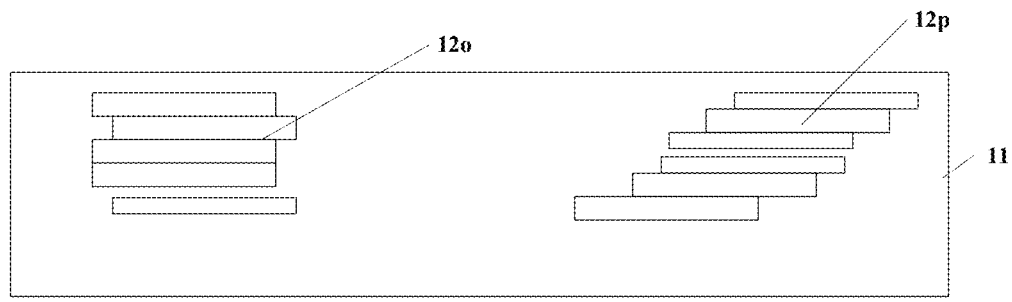

As shown in FIG. 4H, some of the tabs 12o in one group are offset, but all tabs 12p in the other group are offset. The tabs 12p in the other group are offset leftward in sequence from the uppermost layer to the lowermost layer.

Figure 4I:
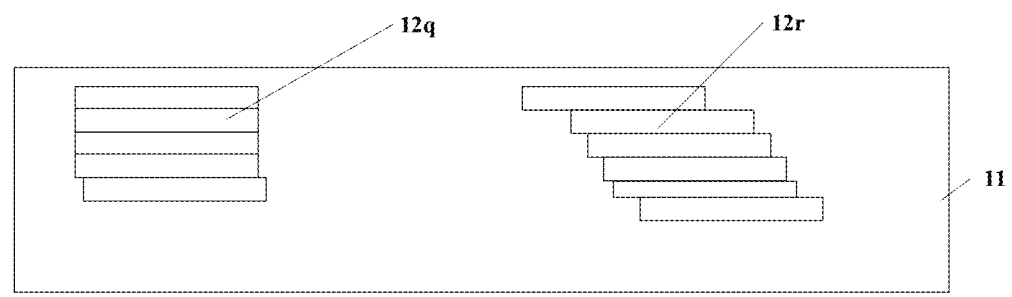

As shown in FIG. 4I, the tabs 12q in one group are almost not offset, but all tabs 12r in the other group are offset. The tabs 12r in the other group are offset rightward in sequence from the uppermost layer to the lowermost layer.

By now, different offset states of the tabs have been described above with reference to FIG. 4A to FIG. 4I exemplarily rather than exhaustively.

In the preceding embodiments, the zoom ranges of the first zoom lens 212 and the second zoom lens 222 can tolerate an offset of the tabs, and therefore, the offset of the tabs can be identified, thereby making it convenient to obtain clear images of the tabs that are offset by different amounts and photographed at different focal lengths, and in turn, improving the accuracy of detecting tab folding subsequently.

Referring back to FIG. 3, in some embodiments, the first image obtaining module 21 may further include a first light source 213. The first light source 213 is located between the first zoom lens 212 and the first lateral face 121 of the tab 12. By supplying light from the first light source 213, the first photographing device 211 can obtain a clearer and brighter image, thereby improving the accuracy of detecting tab folding.

For example, the first light source 213 may be an annular light source. As shown in FIG. 3, an axial direction of the first zoom lens 212 is consistent with an axial direction of the first light source. In this way, after the light emitted by the first light source strikes the first lateral face 121 of the tabs, the light is reflected by the first lateral face 121, passes through the center of the first light source, and arrives at the first zoom lens 212, so that an image of the first lateral face 121 is shot by the first photographing device 211. The first light source 213 designed in an annular shape makes it convenient to obtain the image of the lateral face of the tabs.

In some embodiments, as shown in FIG. 3, the second image obtaining module 22 may further include a prism 224 and a second light source 223.

The prism 224 is disposed on the side of the second lateral face 122 of the tab 12. A first mirror face of the prism 224 is oriented toward the second lateral face 122 of the tabs, and a second mirror face of the prism 224 is oriented toward the second zoom lens 222. The second light source 223 is disposed between the second zoom lens 222 and the second mirror face of the prism 224. Light emitted by the second light source 223 enters the prism 224 through the second mirror face, exits from the first mirror face of the prism 224, and strikes the second lateral face 122 of the tabs. In this way, the second lateral face 122 of the tab reflects the light incident on the second lateral face. The reflected light enters the prism through the first mirror face of the prism 224, exits from the second mirror face of the prism, and strikes the second zoom lens 222, so that an image of the first lateral face 122 is shot by the second photographing device 221.

In the foregoing embodiment, the prism disposed can change an optical path and bend the optical path. In this way, the second photographing device 221, the second zoom lens 222, and the second light source 223 are disposed in other appropriate positions when it is not convenient to dispose the second photographing device 221, the second zoom lens 222, and the second light source 223 between two tabs, so as to facilitate tab detection.

For example, a cross section of the prism 224 may be a triangle such as a right triangle. Definitely, a person skilled in the art understands that the shape of the prism 224 is merely exemplary, and the scope of this application is not limited to the examples.

For example, the second light source 223 may be an annular light source. As shown in FIG. 3, an axial direction of the second zoom lens 222 is consistent with an axial direction of the second light source. In this way, after the light emitted by the second light source strikes the second lateral face 122 of the tabs through the prism 224, the light is reflected by the second lateral face 122, passes through the prism 224 and the center of the second light source, and arrives at the second zoom lens 222, so that an image of the second lateral face 122 is shot by the second photographing device 221. The second light source 223 designed in an annular shape makes it convenient to obtain the image of the lateral face of the tabs.

In the foregoing embodiment, two camera suites shoot the images of the first lateral face and the second lateral face of the tabs, and process the images to effectively detect various folded states of the tabs and reduce an omission factor.

Figure 5:
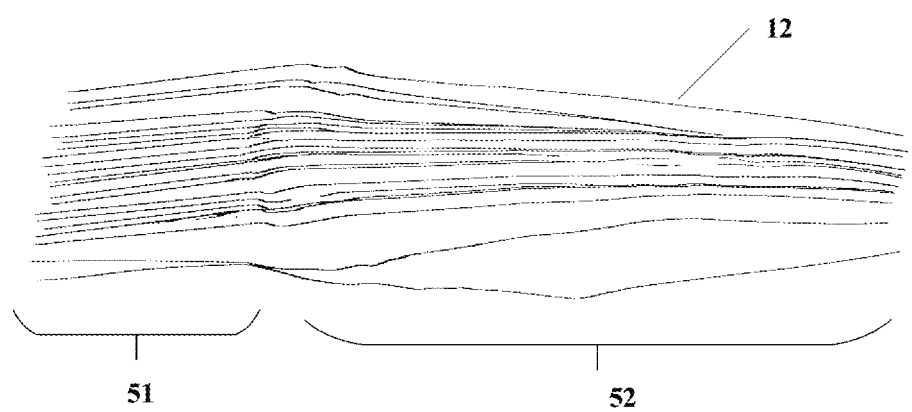
FIG. 5 is a schematic diagram of an image of a lateral face of tabs according to an embodiment of this application.

FIG. 5 is a schematic diagram of an image of a lateral face of tabs according to an embodiment of this application. For example, FIG. 5 may be an image of the first lateral face of the tabs, or an image of the second lateral face of the tabs. As can be seen from FIG. 5, the image of the lateral face of the tabs may be regarded as a plurality of lines. For example, each line may represent a layer of tab.

In some embodiments, the image analyzer 23 may be configured to analyze the first image to obtain characteristic parameters of a plurality of lines in the first image, obtain the first number of layers of the tabs based on the characteristic parameters of the plurality of lines in the first image, analyze the second image to obtain characteristic parameters of a plurality of lines in the second image, and obtain the second number of layers of the tabs based on the characteristic parameters of the plurality of lines in the second image.

In this embodiment, as can be seen with reference to FIG. 5, the image analyzer 23 can obtain a plurality of lines in the image based on the image of the lateral face of the tabs, and can obtain the number of layers of the tabs based on the characteristic parameters of the plurality of lines. The number of layers of the tabs is obtained by using the characteristic parameters of the lines in the image, thereby improving the accuracy of the number of layers of the tabs, and in turn, improving the accuracy of detecting tab folding.

In some embodiments, the characteristic parameters of the lines may include at least one of curvature, thickness, direction change trend, length of the lines, or the like. Different line characteristic parameters may correspond to different numbers of layers of the tabs. For example, a model is established by using curvature, thickness, line direction change trend, length, and the like, and the number of layers of the tabs is calculated based on the model. For another example, the number of layers of the tabs is obtained by using the characteristic parameters such as curvature, thickness, line direction change trend, and length, and a correspondence between the characteristic parameters and the number of layers of the tabs.

In some embodiments, the image analyzer 23 may be further configured to determine, based on the length of the lines, whether the tabs are folded over to a coating region. For example, the image analyzer 23 is configured to determine whether the length of the lines is less than a preset length; determine, if the length of the lines is less than the preset length, that the tabs are folded over to the coating region; and determine, if the length of the lines is greater than or equal to the preset length, that the tabs are not folded over to the coating region. This tells whether there is a risk of folding the tabs over to the coating region, and enables detection of a battery cell with tabs folded over to the coating region, thereby reducing safety hazards of the battery cell.

It needs to be noted that the preset length may be determined based on actual needs. For example, the preset length may be one-half or three-fifths of a normal line length of an unfolded tab. Definitely, a person skilled in the art understands that the scope of this application is not limited to the examples.

As shown in FIG. 5, in the image of the lateral face of the tabs, the lateral face of the tabs may include a tab root region 51 and a tab top region 52. The tab root region 51 is a region contiguous to the coating region of the battery cell on the lateral face of the tabs. In other words, the tab root region is a region that, in the image of the tabs, extends from a boundary between the tabs and the coating region toward the tabs by a preset distance. The preset distance may be determined based on actual conditions or actual needs. The tab top region 52 is a region farther from the coating region than the tab root region on the lateral face of the tabs. In other words, the coating region (not shown in FIG. 5) is located to the left side of the tab root region 51 in FIG. 5.

For example, the first image includes a first tab root region, and the second image includes a second tab root region. The first tab root region is a region adjacent to a coating region of the battery cell on the first lateral face of the tabs, and the second tab root region is a region adjacent to the coating region on the second lateral face of the tabs. For example, the first image includes a first tab top region, and the second image includes a second tab top region. The first tab top region is a region farther from the coating region than the first tab root region on the first lateral face of the tabs, and the second tab top region is a region farther from the coating region than the second tab root region on the second lateral face of the tabs.

In some embodiments, the image analyzer 23 may be configured to compare the first number of layers in a first tab root region in the first image with the preset value, and/or compare the second number of layers in a second tab root region in the second image with the preset value. In this way, the image analyzer determines, in a case of at least one of inequality between the first number of layers and a preset value or inequality between the second number of layers and a preset value, that the tabs are in the folded state.

Generally, in the top region of the tabs, different layers of the tabs are prone to bond together. In the root region of the tabs, the root of the tabs is separated by the separator, the tabs are more supportive, and the gap between the tabs are larger. Therefore, the layers in the root region of the tabs are not prone to bond together. Therefore, in the foregoing embodiment, by comparing the number of layers of the tabs in the root region of the tabs with a preset value, it is determined whether the tabs are in a folded state, thereby significantly improving the accuracy of detecting tab folding.

In some embodiments, the image analyzer 23 may be configured to determine, based on an appearance and a number of lines in a first tab top region in the first image, whether the tabs are in the folded state; and/or determine, based on an appearance and a number of lines in a second tab top region in the second image, whether the tabs are in the folded state. All layers of the taps in the tab top region are prone to bond together, making it difficult to obtain the number of layers of the tabs accurately. Therefore, the image analyzer 23 such as an artificial intelligence (AI) image analyzer may determine, based on the appearance and number of lines and by using an appearance feature detection method, whether the tabs are folded. In this embodiment, whether the tabs are in a folded state is further determined based on the appearance and the number of lines in the tab top region, so that the folded state of the tabs is determined supplementally.

For example, in a case that the number of layers in the tab root region in the first image or the second image is equal to the preset value, it may be determined that the tabs are not in a folded state, or, just determined that the root of the tabs is not in a folded state. Here, further, whether the tabs are in a folded state in the top region may be determined supplementally based on the appearance and number of lines in the tab top region. For another example, in a case that the number of layers in the tab root region in the first image or the second image is not equal to the preset value, it may be determined that the tabs are in a folded state. Here, further, the folded state of the tabs may be further verified based on the appearance and number of lines in the tab top region. In this way, errors are avoided in a case that the number of lines in the tab root region is determined mistakenly, and the accuracy of detecting tab folding is further improved.

Here, the appearance of lines means morphology of the lines. For example, the appearance of lines may include the characteristic parameters of lines mentioned above, such as curvature, thickness, direction change trend, and/or length of the lines, or the like. For example, the greater the curvature of the lines, the more curved the lines, and the higher the probability that the tabs are folded. For another example, short and thick lines indicate that the tabs may be folded. After the tabs are folded, the length of lines on the lateral face is different from the preset length. For example, when the tabs are folded over to the coating region, the entire length of the tabs is less than the preset length. When the tabs are folded over to the tab region, the entire length of the tabs is greater than or equal to the preset length. In addition, the appearance of the lines may further include morphology such as breakpoints. The number of lines can approximately reflect the number of layers of the tabs. For example, each line represents a layer of tab. For example, in a case that the number of lines is different from the preset value and the lines are relatively short and thick, it is determined that the tabs are at high risk of being folded.

In the foregoing embodiment, judgment logics vary between different regions in the cross-sectional view of the lateral face of the tabs. In the tab root region, it is determined that the tabs are in a folded state no matter whether the number of layers of tabs on the side of the first lateral face or the number of layers of tabs on the side of the second lateral face is different from the preset value. In other regions (such as the top region), whether the tabs are in a folded state is detected supplementally based on the appearance and number of lines in a sectional view of the tabs on the lateral face. A copper foil or aluminum foil at the root of the tabs is more supportive, and the tab top far from the root is less supportive and more prone to bond together and affect visual detection. Therefore, the foregoing detection method pertinent to different regions can effectively solve the problem of misjudgment in detection, improve the detectable rate of substandard tabs, and improve the quality of the battery cell.

By now, the apparatus for detecting tab folding according to other embodiments of this application has been described above. The apparatus obtains the sectional images of the first lateral face and the second lateral face (also referred to as an inner side and an outer side respectively, or a left side and a right side respectively) of layered tabs of the battery cell. The apparatus synthesizes the sectional images of both lateral faces of the tabs by using a multi-frame image synthesis algorithm, and analyzes and processes the appearance and dimension measurement data of the tabs in the images. The apparatus obtains the number of layers of the tabs in given regions of the first lateral face and the second lateral face of the tabs, and compares image processing results of the tabs with the preset values of the number of layers of the tabs respectively to determine the folded state of the tabs. This improves the detectable rate of substandard tabs, and in turn, improves quality of the battery cell.

Figure 6:
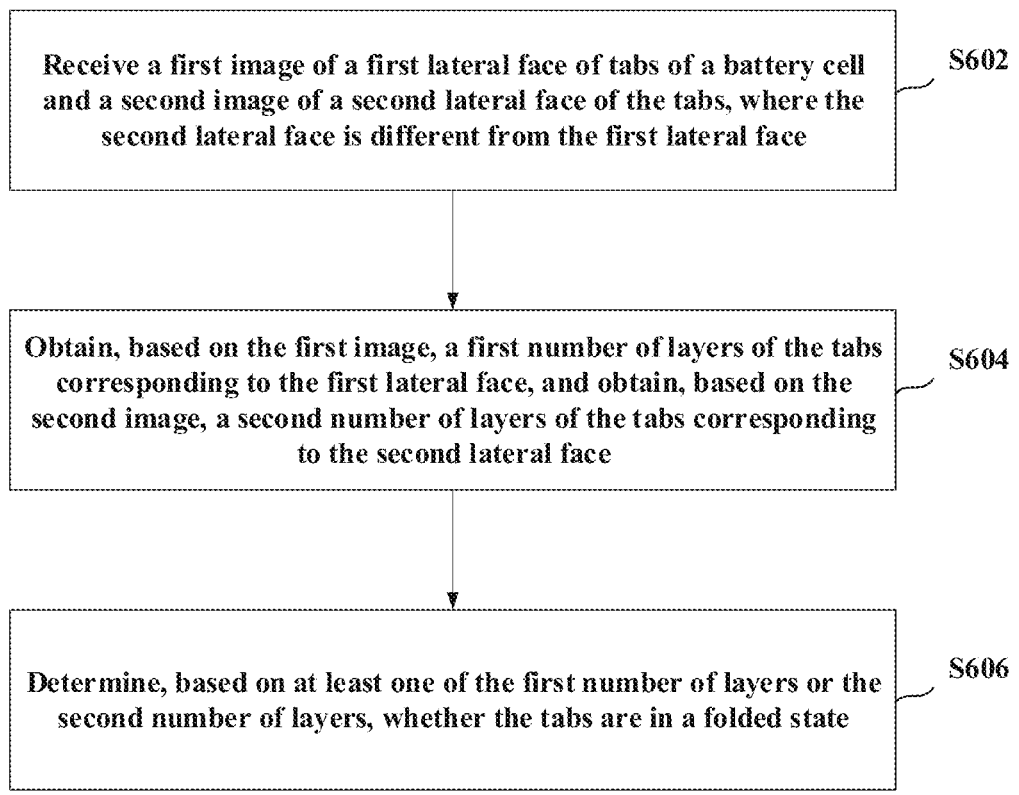
FIG. 6 is a flowchart of a method for detecting tab folding according to an embodiment of this application.

FIG. 6 is a flowchart of a method for detecting tab folding according to an embodiment of this application. As shown in FIG. 6, the method includes steps S602 to S606.

Step S602: Receive a first image of a first lateral face of tabs of a battery cell and a second image of a second lateral face of the tabs, where the second lateral face is different from the first lateral face.

In some embodiments, step S602 includes: receiving a plurality of first initial images of the first lateral face at different focal lengths and a plurality of second initial images of the second lateral face at different focal lengths. In this embodiment, a plurality of first initial images of the first lateral face at different focal lengths and a plurality of second initial images of the second lateral face at different focal lengths can be obtained, thereby making it convenient to synthesize the plurality of first initial images into a clearer first image and synthesize the plurality of second initial images into a clearer second image subsequently.

Step 604: Obtain, based on the first image, a first number of layers of the tabs corresponding to the first lateral face, and obtain, based on the second image, a second number of layers of the tabs corresponding to the second lateral face.

In some embodiments, the method may further include: synthesizing, before obtaining the first number of layers based on the first image and obtaining the second number of layers based on the second image, the plurality of first initial images into one first image and synthesizing the plurality of second initial images into one second image by using a multi-frame image synthesis algorithm. By synthesizing a plurality of first initial images at different focal lengths into one first image and synthesizing a plurality of second initial images at different focal lengths into one second image, this embodiment improves definition of the first image and the second image, obtains the first number of layers and the second number of layers that are more accurate, and in turn, improves the accuracy of detecting tab folding.

In some embodiments, step S604 may include: analyzing the first image to obtain characteristic parameters of a plurality of lines in the first image, obtaining the first number of layers of the tabs based on the characteristic parameters of the plurality of lines in the first image, analyzing the second image to obtain characteristic parameters of a plurality of lines in the second image, and obtaining the second number of layers of the tabs based on the characteristic parameters of the plurality of lines in the second image. For example, the characteristic parameters may include at least one of curvature, thickness, direction change trend, or length of the lines. For example, a model is established by using curvature, thickness, line direction change trend, length, and the like, and the number of layers of the tabs is calculated based on the model. For another example, the number of layers of the tabs is obtained by using the characteristic parameters such as curvature, thickness, line direction change trend, and length, and a correspondence between the characteristic parameters and the number of layers of the tabs. In this embodiment, the characteristic parameters of lines in the image are obtained based on the image. The number of layers of the tabs is obtained by using the characteristic parameters of the lines in the image, thereby improving the accuracy of the number of layers of the tabs, and in turn, improving the accuracy of detecting tab folding.

Step S606: Determine, based on at least one of the first number of layers or the second number of layers, whether the tabs are in a folded state.

In some embodiments, step S606 includes: determining, in a case of at least one of inequality between the first number of layers and a preset value or inequality between the second number of layers and a preset value, that the tabs are in the folded state. In this embodiment, by comparing the first number of layers with the preset value and/or comparing the second number of layers with the preset value, based on a comparison result, it is determined whether the tabs are in a folded state, thereby more accurately detecting whether the tabs are folded.

In some embodiments, the step of comparing the first number of layers with the preset value and/or comparing the second number of layers with the preset value includes: comparing the first number of layers in a first tab root region in the first image with the preset value, and/or comparing the second number of layers in a second tab root region in the second image with the preset value. The first tab root region is a region adjacent to a coating region of the battery cell on the first lateral face of the tabs, and the second tab root region is a region adjacent to the coating region on the second lateral face of the tabs. In this embodiment, based on the number of layers of the tabs in the root region of the tabs, it is determined whether the tabs are in a folded state, thereby significantly improving the accuracy of detecting tab folding.

By now, the method for detecting tab folding according to some embodiments of this application has been described above. In this method, a first image of a first lateral face of tabs of a battery cell and a second image of a second lateral face of the tabs are received, where the second lateral face is different from the first lateral face; based on the first image, a first number of layers of the tabs corresponding to the first lateral face is obtained, and based on the second image, a second number of layers of the tabs corresponding to the second lateral face is obtained; and, based on at least one of the first number of layers or the second number of layers, it is determined whether the tabs are in a folded state. In this way, the number of layers on the two lateral faces of the tabs can be accurately obtained by obtaining the images of the two lateral faces of the tabs. Based on at least one of the two numbers of layers, it is more accurately determined whether the tabs are in a folded state. Therefore, the foregoing embodiment can improve the accuracy of detecting tab folding.

In some embodiments, the method may further include: determining, based on the length of the lines, whether the tabs are folded over to a coating region. For example, the step of determining, based on the length of the lines, whether the tabs are folded over to a coating region, includes: determining whether the length of the lines is less than a preset length; determining, if the length of the lines is less than the preset length, that the tabs are folded over to the coating region; and determining, if the length of the lines is greater than or equal to the preset length, that the tabs are not folded over to the coating region. This tells whether there is a risk of folding the tabs over to the coating region, thereby reducing safety hazards of the battery cell.

Figure 7:
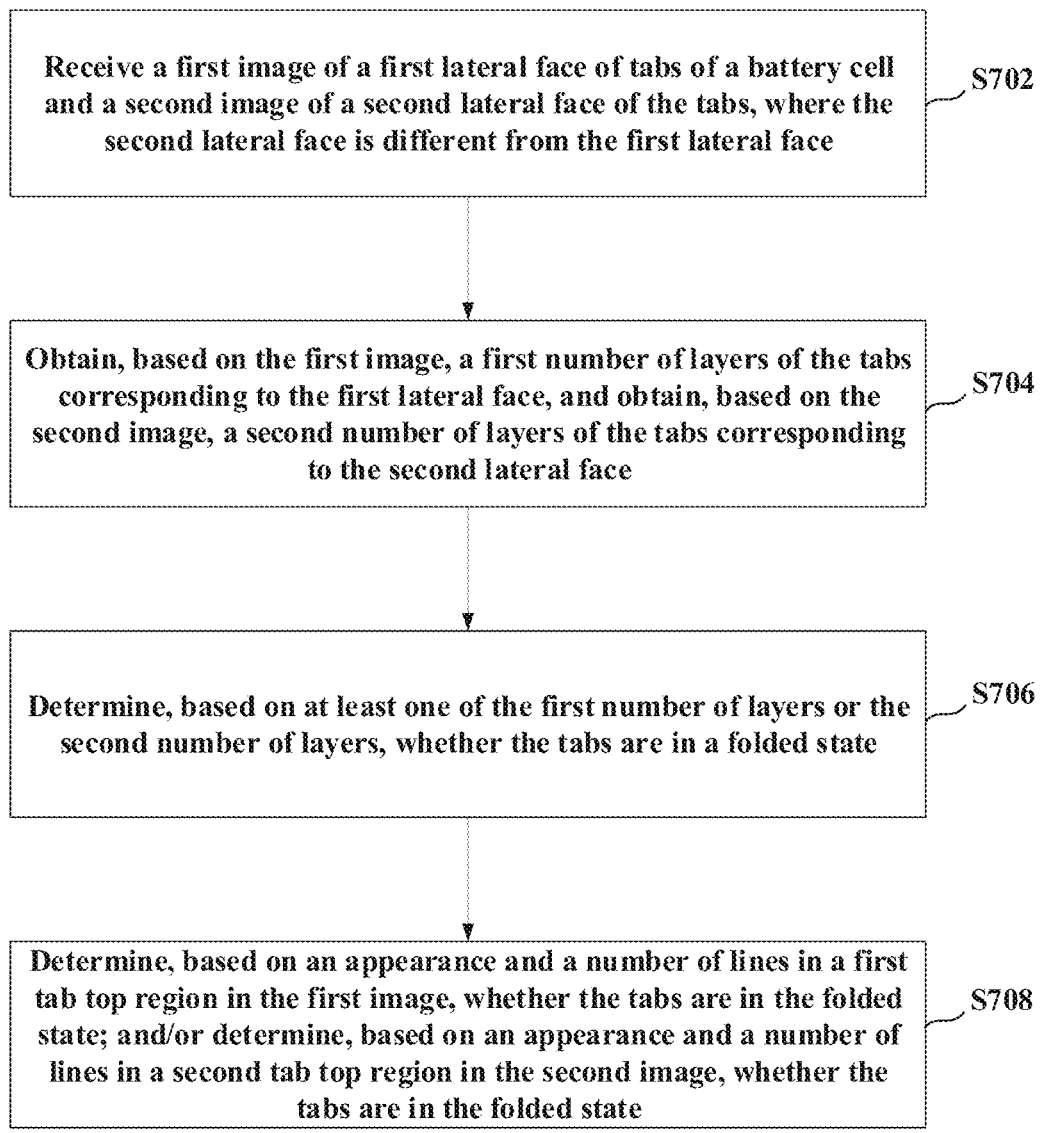
FIG. 7 is a flowchart of a method for detecting tab folding according to another embodiment of this application.

FIG. 7 is a flowchart of a method for detecting tab folding according to another embodiment of this application. As shown in FIG. 7, the method includes steps S702 to S708.

Step S702: Receive a first image of a first lateral face of tabs of a battery cell and a second image of a second lateral face of the tabs, where the second lateral face is different from the first lateral face.

Step 704: Obtain, based on the first image, a first number of layers of the tabs corresponding to the first lateral face, and obtain, based on the second image, a second number of layers of the tabs corresponding to the second lateral face.

Step S706: Determine, based on at least one of the first number of layers or the second number of layers, whether the tabs are in a folded state.

For example, the first number of layers in a first tab root region in the first image is compared with the preset value, and the second number of layers in a second tab root region in the second image is compared with the preset value; and, in a case of at least one of inequality between the first number of layers and the preset value or inequality between the second number of layers and the preset value, it is determined that the tabs are in the folded state.

Step S708: Determine, based on an appearance and a number of lines in a first tab top region in the first image, whether the tabs are in the folded state; and/or determine, based on an appearance and a number of lines in a second tab top region in the second image, whether the tabs are in the folded state. Here, the first tab top region is a region farther from the coating region than the first tab root region on the first lateral face of the tabs, and the second tab top region is a region farther from the coating region than the second tab root region on the second lateral face of the tabs.

By now, the method for detecting tab folding according to another embodiment of this application has been described above. In this method, whether the tabs are in a folded state is determined based on the number of layers on the two lateral faces of the tabs, and additionally, whether the tabs are in a folded state is determined based on the appearance and the number of lines in the tab top region, thereby improving the accuracy of detecting tab folding.

Figure 8:
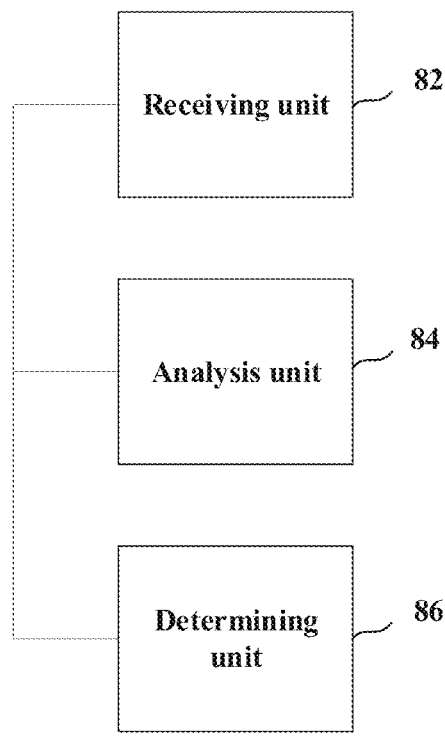
FIG. 8 is a schematic structural diagram of an image analyzer according to an embodiment of this application.

FIG. 8 is a schematic structural diagram of an image analyzer according to an embodiment of this application. As shown in FIG. 8, the image analyzer includes a receiving unit 82, an analysis unit 84, and a determining unit 86.

The receiving unit 82 is configured to receive a first image of a first lateral face of tabs of a battery cell and a second image of a second lateral face of the tabs. The second lateral face is different from the first lateral face.

The analysis unit 84 is configured to obtain, based on the first image, a first number of layers of the tabs corresponding to the first lateral face, and obtain, based on the second image, a second number of layers of the tabs corresponding to the second lateral face.

The determining unit 86 is configured to determine, based on at least one of the first number of layers or the second number of layers, whether the tabs are in a folded state.

By now, the image analyzer according to an embodiment of this application has been described above. In the image analyzer, the receiving unit receives the first image of the first lateral face of tabs of the battery cell and the second image of the second lateral face of the tabs. The analysis unit obtains, based on the first image, the first number of layers of the tabs corresponding to the first lateral face, and obtains, based on the second image, the second number of layers of the tabs corresponding to the second lateral face. The determining unit determines, based on at least one of the first number of layers or the second number of layers, whether the tabs are in a folded state, thereby improving the accuracy of detecting tab folding.

In some embodiments, the receiving unit 82 is configured to receive a plurality of first initial images of the first lateral face at different focal lengths and a plurality of second initial images of the second lateral face at different focal lengths. In this embodiment, the receiving unit can receive a plurality of first initial images of the first lateral face at different focal lengths and a plurality of second initial images of the second lateral face at different focal lengths, thereby making it convenient to synthesize the plurality of first initial images into a clearer first image and synthesize the plurality of second initial images into a clearer second image subsequently.

In some embodiments, the analysis unit 84 is configured to synthesize the plurality of first initial images into one first image and synthesize the plurality of second initial images into one second image by using a multi-frame image synthesis algorithm. By synthesizing a plurality of first initial images at different focal lengths into one first image and synthesizing a plurality of second initial images at different focal lengths into one second image, this embodiment improves definition of the first image and the second image, obtains the first number of layers and the second number of layers that are more accurate, and in turn, improves the accuracy of detecting tab folding.

In some embodiments, the analysis unit 84 is configured to analyze the first image to obtain characteristic parameters of a plurality of lines in the first image, obtain the first number of layers of the tabs based on the characteristic parameters of the plurality of lines in the first image, analyze the second image to obtain characteristic parameters of a plurality of lines in the second image, and obtain the second number of layers of the tabs based on the characteristic parameters of the plurality of lines in the second image. For example, the characteristic parameters include at least one of curvature, thickness, direction change trend, or length of the lines. In this embodiment, the analysis unit obtains the characteristic parameters of lines in the image based on the image, and obtains the number of layers of the tabs by using the characteristic parameters of the lines in the image, thereby improving the accuracy of the number of layers of the tabs, and in turn, improving the accuracy of detecting tab folding.

In some embodiments, the determining unit 86 is configured to determine, in a case of at least one of inequality between the first number of layers and a preset value or inequality between the second number of layers and a preset value, that the tabs are in the folded state. In this embodiment, the determining unit compares the first number of layers with the preset value and/or compares the second number of layers with the preset value, and determines, based on a comparison result, whether the tabs are in a folded state, thereby more accurately detecting whether the tabs are folded.

In some embodiments, the determining unit 86 is configured to determine, based on the length of the lines, whether the tabs are folded over to a coating region. For example, the determining unit 86 is configured to determine whether the length of the lines is less than a preset length; determine, if the length of the lines is less than the preset length, that the tabs are folded over to the coating region; and determine, if the length of the lines is greater than or equal to the preset length, that the tabs are not folded over to the coating region. This tells whether there is a risk of folding the tabs over to the coating region, thereby reducing safety hazards of the battery cell.

In some embodiments, the determining unit 86 is configured to compare the first number of layers in a first tab root region in the first image with the preset value, and/or compare the second number of layers in a second tab root region in the second image with the preset value. The first tab root region is a region adjacent to a coating region of the battery cell on the first lateral face of the tabs, and the second tab root region is a region adjacent to the coating region on the second lateral face of the tabs. In this embodiment, the determining unit determines, based on the number of layers of the tabs in the root region of the tabs, whether the tabs are in a folded state, thereby significantly improving the accuracy of detecting tab folding.

In some embodiments, the determining unit 86 may be further configured to determine, based on an appearance and a number of lines in a first tab top region in the first image, whether the tabs are in the folded state; and/or determine, based on an appearance and a number of lines in a second tab top region in the second image, whether the tabs are in the folded state. The first tab top region is a region farther from the coating region than the first tab root region on the first lateral face of the tabs, and the second tab top region is a region farther from the coating region than the second tab root region on the second lateral face of the tabs. In this embodiment, whether the tabs are in a folded state is further determined based on the appearance and the number of lines in the tab top region, so that the folded state of the tabs is determined supplementally.

Figure 9:
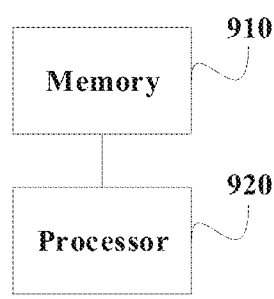
FIG. 9 is a schematic structural diagram of an image analyzer according to another embodiment of this application.

FIG. 9 is a schematic structural diagram of an image analyzer according to another embodiment of this application. The image analyzer includes a memory 910 and a processor 920, where the memory 910 may be a magnetic disk, a flash memory, or any other non-volatile storage medium. The memory is configured to store instructions in the embodiments corresponding to FIG. 6 and/or FIG. 7.

The processor 920 is coupled to the memory 910, and may be implemented as one or more integrated circuits, such as a microprocessor or microcontroller. In this way, the processor 920 is configured to execute an instruction stored in the memory, obtain the number of layers on the two lateral faces of the tabs accurately by obtaining the images of the two lateral faces of the tabs, and therefore, based on at least one of the two numbers of layers, more accurately determine whether the tabs are in a folded state. Therefore, the foregoing embodiment can improve the accuracy of detecting tab folding.

Figure 10:
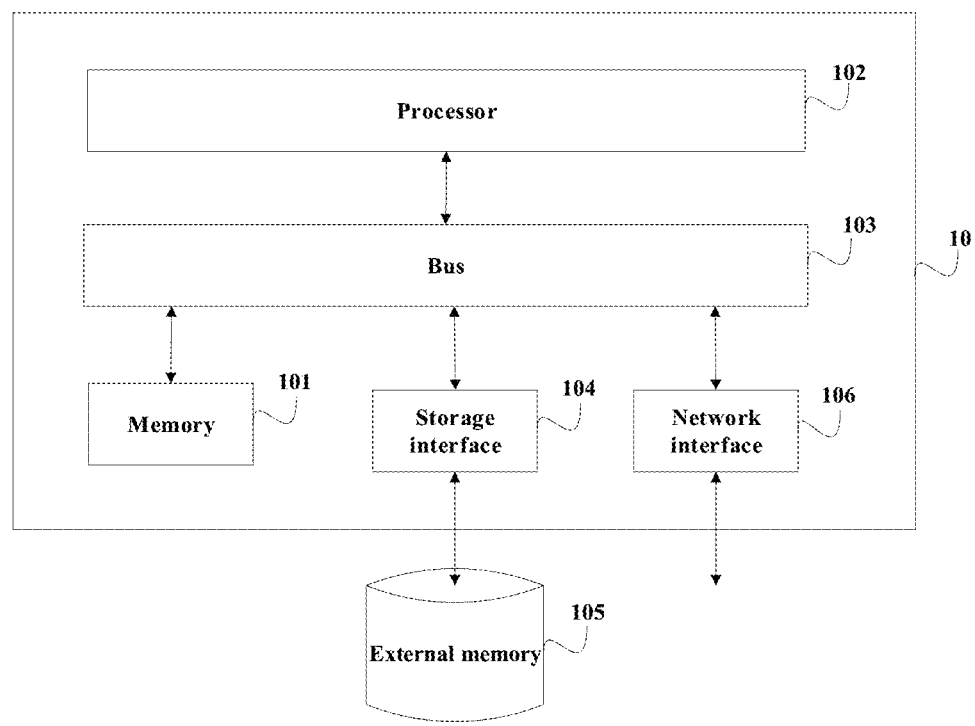
FIG. 10 is a schematic structural diagram of an image analyzer according to another embodiment of this application.

In some embodiments, as shown in FIG. 10, the image analyzer 10 may further include a memory 101 and a processor 102. The processor 102 is coupled to the memory 101 through a bus 103. The image analyzer 10 may be further connected to an external storage device 105 through a storage interface 104 to invoke external data, and may be further connected to a network or another computer system (not shown) through a network interface 106, details of which are omitted here.

In this embodiment, the memory stores data instructions, and the processor processes the instructions. The number of layers on the two lateral faces of the tabs can be accurately obtained by obtaining the images of the two lateral faces of the tabs. Based on at least one of the two numbers of layers, it is more accurately determined whether the tabs are in a folded state. Therefore, the foregoing embodiment can improve the accuracy of detecting tab folding.

In other embodiments, this application further provides a computer-readable storage medium, on which a computer program instruction is stored. When executed by a processor, the instruction implements steps of the method in the embodiments corresponding to FIG. 6 and/or FIG. 7. A person skilled in the art understands that the embodiments of this application may be provided as a method, an apparatus, or a computer program product. Therefore, this application may adopt the form of hardware-only embodiments, software-only embodiments, or software-and-hardware embodiments. Moreover, this application may adopt the form of a computer program product that is implemented on one or more computer-operable non-transitory storage media (including but not limited to a disk memory, a CD-ROM, an optical memory, and the like) that store computer-executable program code.

This application is described with reference to flowcharts and/or block diagrams of the method, device (system), and computer program product according to the embodiments of this application. Understandably, a computer program instruction may implement each process and/or block in the flowchart and/or block diagram, or implement a combination of processes and/or blocks in the flowchart and/or block diagram. The computer program instructions may be provided for a universal computer, a dedicated computer, an embedded processor, or a processor of other programmable data processing devices to bring forth a machine, so that the instructions executed by the computer or the processor of other programmable data processing devices bring forth an apparatus that is configured to implement functions specified in one or more processes in a flowchart and/or one or more blocks in a block diagram.

Alternatively, the computer program instructions may be stored in a computer-readable memory capable of inducing the computer or other programmable data processing devices to work in a specific way, so that the instructions stored in the computer-readable memory bring forth a manufactured product that includes an instruction device. The instruction device implements the functions specified in one or more processes in a flowchart and/or one or more blocks in a block diagram.

Alternatively, the computer program instructions may be loaded onto a computer or other programmable data processing devices, so as to perform a series of operation steps on the computer or other programmable devices to actuate computerized processing. In this way, the instructions executed on the computer or other programmable devices give rise to the steps that are used to implement the functions specified in one or more processes in a flowchart and/or one or more blocks in a block diagram.

Although this application has been described with reference to exemplary embodiments, various improvements may be made to the embodiments without departing from the scope of this application, and the components of this application may be replaced with equivalents. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:

1. An apparatus for detecting tab folds, comprising:
   a first imaging device, configured to obtain a first image of a first lateral face of tabs of a battery cell;
   a second imaging device, configured to obtain a second image of a second lateral face of the tabs, wherein the second lateral face is different from the first lateral face;
   an image analyzer, configured to:
      obtain, based on the first image, a first number of layers of the tabs corresponding to the first lateral face, and obtain, based on the second image, a second number of layers of the tabs corresponding to the second lateral face; and
      determine, based on at least one of the first number of layers or the second number of layers, whether the tabs are in a folded state,
   wherein
   the first imaging device comprises a first photographing device, a first zoom lens adjacent to the first photographing device, and a first light source located between the first zoom lens and the first lateral face of the tabs, and the first photographing device is configured to shoot a plurality of first initial images of the first lateral face at different focal lengths in a case that the first zoom lens is zoomed for a plurality of times, and send the plurality of first initial images to the image analyzer;
   the second imaging device comprises a second photographing device, a second zoom lens adjacent to the second photographing device, a prism disposed on the side of the second lateral face of the tabs, and a second light source, and the second photographing device is configured to shoot a plurality of second initial images of the second lateral face at different focal lengths in a case that the second zoom lens is zoomed for a plurality of times, and send the plurality of second initial images to the image analyzer; and
   the image analyzer is configured to synthesize the plurality of first initial images into one first image and synthesize the plurality of second initial images into one second image by using a multi-frame image synthesis algorithm;
   wherein a first mirror face of the prism is oriented toward the second lateral face of the tabs, and a second mirror face of the prism is oriented toward the second zoom lens; and
   wherein the second light source is disposed between the second zoom lens and the second mirror face of the prism, and light emitted by the second light source enters the prism through the second mirror face, exits from the first mirror face, and strikes the second lateral face of the tabs.

2. The apparatus according to claim 1, wherein the image analyzer is configured to
   analyze the first image to obtain characteristic parameters of a plurality of lines in the first image,
   obtain the first number of layers of the tabs based on the characteristic parameters of the plurality of lines in the first image,
   analyze the second image to obtain characteristic parameters of a plurality of lines in the second image, and
   obtain the second number of layers of the tabs based on the characteristic parameters of the plurality of lines in the second image.

3. The apparatus according to claim 2, wherein the characteristic parameters comprise at least one of curvature, thickness, direction change trend, or length of the lines.

4. The apparatus according to claim 2, wherein the image analyzer is further configured to determine, based on the length of the lines, whether the tabs are folded over to a coating region.

5. The apparatus according to claim 1, wherein the image analyzer is configured to
   determine, in a case of at least one of inequality between the first number of layers and a preset value or inequality between the second number of layers and a preset value, that the tabs are in the folded state.

6. The apparatus according to claim 5, wherein
   the image analyzer is configured to compare the first number of layers in a first tab root region in the first image with the preset value, and/or compare the second number of layers in a second tab root region in the second image with the preset value,
   wherein, the first tab root region is a region adjacent to a coating region of the battery cell on the first lateral face of the tabs, and the second tab root region is a region adjacent to the coating region on the second lateral face of the tabs.

7. The apparatus according to claim 6, wherein
   the image analyzer is configured to determine, based on an appearance and a number of lines in a first tab top region in the first image, whether the tabs are in the folded state;
   and/or determine, based on an appearance and a number of lines in a second tab top region in the second image, whether the tabs are in the folded state,
   wherein, the first tab top region is a region farther from the coating region than the first tab root region on the first lateral face of the tabs, and the second tab top region is a region farther from the coating region than the second tab root region on the second lateral face of the tabs.

8. A method for detecting tab folds, performed by an apparatus for detecting tab folds, wherein the apparatus comprises a first imaging device, a second imaging device and an image analyzer, the first imaging device comprises a first photographing device, a first zoom lens adjacent to the first photographing device, and a first light source located between the first zoom lens and a first lateral face of the tabs, the second imaging device comprises a second photographing device, a second zoom lens adjacent to the second photographing device, a prism disposed on the side of the second lateral face of the tabs, and a second light source, a first mirror face of the prism is oriented toward a second lateral face of the tabs, and a second mirror face of the prism is oriented toward the second zoom lens; the second light source is disposed between the second zoom lens and the second mirror face of the prism, and light emitted by the second light source enters the prism through the second mirror face, exits from the first mirror face, and strikes the second lateral face of the tab; the method comprising:

obtaining, by the first imaging device, a first image of the first lateral face of tabs of a battery cell;

obtaining, by the second imaging device, a second image of the second lateral face of the tabs, wherein the second lateral face is different from the first lateral face;

obtaining, by the image analyzer based on the first image, a first number of layers of the tabs corresponding to the first lateral face, and obtaining, by the image analyzer based on the second image, a second number of layers of the tabs corresponding to the second lateral face; and determining, by the image analyzer based on at least one of the first number of layers or the second number of layers, whether the tabs are in a folded state;

wherein the step of obtaining the first image of the first lateral face of tabs comprises:

shooting, by the first photographing device, a plurality of first initial images of the first lateral face at different focal lengths in a case that the first zoom lens is zoomed for a plurality of times, and sending the plurality of first initial images to the image analyzer;

wherein the step of obtaining the second image of the second lateral face comprises:

shooting, by the second photographing device, a plurality of second initial images of the second lateral face at different focal lengths in a case that the second zoom lens is zoomed for a plurality of times, and sending the plurality of second initial images to the image analyzer;

and the method further comprising:

synthesizing, by the image analyzer before obtaining the first number of layers based on the first image and obtaining the second number of layers based on the second image, the plurality of first initial images into one first image and synthesizing the plurality of second initial images into one second image by using a multi-frame image synthesis algorithm.

9. The method according to claim 8, wherein the step of obtaining the first number of layers based on the first image and obtaining the second number of layers based on the second image comprises:

analyzing the first image to obtain characteristic parameters of a plurality of lines in the first image, and obtaining the first number of layers of the tabs based on the characteristic parameters of the plurality of lines in the first image; and analyzing the second image to obtain characteristic parameters of a plurality of lines in the second image, and obtaining the second number of layers of the tabs based on the characteristic parameters of the plurality of lines in the second image.

10. The method according to claim 9, wherein the characteristic parameters comprise at least one of curvature, thickness, direction change trend, or length of the lines.

11. The method according to claim 10, further comprising:

determining, based on the length of the lines, whether the tabs are folded over to a coating region.

12. The method according to claim 8, wherein the step of determining, based on at least one of the first number of layers or the second number of layers, whether the tabs are in a folded state, comprises:

determining, in a case of at least one of inequality between the first number of layers and a preset value or inequality between the second number of layers and a preset value, that the tabs are in the folded state.

13. The method according to claim 12, wherein the step of comparing the first number of layers with the preset value and/or comparing the second number of layers with the preset value comprises:

comparing the first number of layers in a first tab root region in the first image with the preset value, and/or comparing the second number of layers in a second tab root region in the second image with the preset value, wherein, the first tab root region is a region adjacent to a coating region of the battery cell on the first lateral face of the tabs, and the second tab root region is a region adjacent to the coating region on the second lateral face of the tabs.

14. The method according to claim 13, further comprising:

determining, based on an appearance and a number of lines in a first tab top region in the first image, whether the tabs are in the folded state; and/or determining, based on an appearance and a number of lines in a second tab top region in the second image, whether the tabs are in the folded state, wherein, the first tab top region is a region farther from the coating region than the first tab root region on the first lateral face of the tabs, and the second tab top region is a region farther from the coating region than the second tab root region on the second lateral face of the tabs.

15. A non-transitory computer-readable storage medium, on which a computer program instruction is stored, wherein, when executed, the computer program instruction implements a method for detecting tab folds according to claim 8.

* * * * *